United States Patent
Li et al.

(10) Patent No.: US 11,706,186 B2
(45) Date of Patent: Jul. 18, 2023

(54) METHOD, APPARATUS, MEDIUM, AND DEVICE FOR SCHEDULING ACCESS REQUEST

(71) Applicant: GUIZHOU BAISHANCLOUD TECHNOLOGY CO., LTD., Guiyang (CN)

(72) Inventors: Zize Li, Guiyang (CN); Shaojun Cai, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 0 days.

(21) Appl. No.: 17/630,349

(22) PCT Filed: Jul. 22, 2020

(86) PCT No.: PCT/CN2020/103449
§ 371 (c)(1),
(2) Date: Jan. 26, 2022

(87) PCT Pub. No.: WO2021/017970
PCT Pub. Date: Feb. 4, 2021

(65) Prior Publication Data
US 2022/0294759 A1    Sep. 15, 2022

(30) Foreign Application Priority Data
Jul. 31, 2019    (CN) .......................... 201910699324.1

(51) Int. Cl.
*H04L 61/2503*    (2022.01)
*H04L 67/10*    (2022.01)

(52) U.S. Cl.
CPC .......... *H04L 61/2503* (2013.01); *H04L 67/10* (2013.01)

(58) Field of Classification Search
CPC ...... H04L 61/2503; H04L 61/09; H04L 67/10
(Continued)

(56) References Cited

U.S. PATENT DOCUMENTS 8,756,341 B1 * 6/2014 Richardson ............. H04L 67/63
709/219
10,033,627 B1 * 7/2018 Howard .............. H04L 43/0876
(Continued)

FOREIGN PATENT DOCUMENTS

| CN | 103825837 A | 5/2014 |
|---|---|---|
| CN | 103825975 A | 5/2014 |

(Continued)

OTHER PUBLICATIONS

Machine translation of CN 103825837 B (Year: 2017).*
(Continued)

*Primary Examiner* — Ruolei Zong
(74) *Attorney, Agent, or Firm* — Anova Law Group, PLLC

(57) ABSTRACT

An access request scheduling method includes determining a city and a city operator corresponding to an access source IP segment; selecting, from cloud delivery nodes of the city operator, a preferred node of the access source IP segment; determining a mapping relationship between the access source IP segment and an IP of the preferred node; and issuing the mapping relationship to scheduling agent modules of the cloud delivery nodes in a network.

10 Claims, 2 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 10,097,448 | B1* | 10/2018 | Howard | .............. H04L 43/0876 |
| 10,437,908 | B2 | 10/2019 | Liang et al. | |
| 2002/0052942 | A1* | 5/2002 | Swildens | ............ H04L 67/1008 709/223 |
| 2006/0112176 | A1* | 5/2006 | Liu | ........................ H04L 67/101 709/245 |
| 2010/0125675 | A1 | 5/2010 | Richardson et al. | |
| 2019/0044846 | A1* | 2/2019 | Howard | .............. H04L 61/4511 |
| 2019/0207812 | A1 | 7/2019 | Li et al. | |

FOREIGN PATENT DOCUMENTS

| | | | | |
|---|---|---|---|---|
| CN | 104410691 | A | | 3/2015 |
| CN | 106211277 | A | | 12/2016 |
| CN | 106790530 | A | | 5/2017 |
| CN | 103825837 | B | * | 6/2017 |
| CN | 107071089 | A | | 8/2017 |
| CN | 107395683 | A | * | 11/2017 ............. H04L 61/10 |
| CN | 107395683 | A | | 11/2017 |
| CN | 109639823 | A | | 4/2019 |
| CN | 109729186 | A | | 5/2019 |
| EP | 2355446 | A2 | | 8/2011 |

OTHER PUBLICATIONS

Machine translation of CN 107395683 A (Year: 2017).*
The World Intellectual Property Organization (WIPO) International Search Report for PCT/CN2020/103449 dated Oct. 12, 2020 5 Pages.
The State Intellectual Property Office of People's Republic of China The First Office Action for CN 201910699324.1 dated Jun. 22, 2021 21 pages (with translation).
The State Intellectual Property Office of People's Republic of China The Second Office Action for CN 201910699324.1 dated Dec. 23, 2021 15 pages (with translation).
India Intellectual Property Patent Office Examination Report for Application No. 202227006852 dated Jun. 30, 2022 6 Pages.

* cited by examiner

METHOD, APPARATUS, MEDIUM, AND DEVICE FOR SCHEDULING ACCESS REQUEST

CROSS-REFERENCE TO RELATED APPLICATIONS

The present application is a national stage entry under 35 U.S.C. § 371 of International Application No. PCT/CN2020/103449, filed on Jul. 22, 2020, which claims priority to Chinese Patent Application No. 201910699324.1, titled "METHOD, APPARATUS, MEDIUM, AND DEVICE FOR SCHEDULING ACCESS REQUEST," filed to the State Intellectual Property Office of People's Republic of China on Jul. 31, 2019, which are incorporated herein by reference in their entirety.

TECHNICAL FIELD

The present application relates to, but is not limited to, the technical field of communications, and in particular to a method, apparatus, medium, and device for scheduling an access request.

BACKGROUND

In the content delivery network (CDN), the user's access request is scheduled based on the operator's local domain name system (LDNS), so that the user accesses the nearest cloud delivery node. There are multiple city-level cloud delivery nodes in operators in the same province, and the operators in the same province may share the LDNS. Furthermore, since the setting is complicated for the existing Internet users to use the LDNS, there is waste of scheduling resources in the scheduling process and the normal downloading of large files may be affected.

SUMMARY

In order to overcome the problems in related technologies, the present application provides a method for scheduling an access request, an apparatus for scheduling an access request, a medium, and a device.

According to one aspect of the present application, a method for scheduling an access request is provided, comprising:

determining a city and a city operator corresponding to each access source IP segment;

selecting at least one preferred node of the access source IP segment from cloud delivery nodes of the city operator;

determining a mapping relationship between the access source IP segment and an IP of the preferred node; and issuing the mapping relationship to scheduling agent modules of the cloud delivery nodes in a network.

Wherein, the selecting at least one preferred node of the access source IP segment from cloud delivery nodes of the city operator comprises:

obtaining historical network transmission state parameters of the cloud delivery nodes of the city operator in processing data of the access source IP segment, and selecting a preferred node according to the historical network transmission state parameters.

Wherein, the selecting at least one preferred node of the access source IP segment from cloud delivery nodes of the city operator further comprises: obtaining real-time loads of the cloud delivery nodes of the city operator; and the selecting a preferred node according to the historical network transmission state parameters comprises: selecting a preferred node according to the historical network transmission state parameters and the real-time loads.

Wherein, the method further comprises: after the cloud delivery nodes receive a user's access request, scheduling, by the scheduling agent modules of the cloud delivery nodes, the user's access request according to the mapping relationship.

Wherein, the scheduling, by the scheduling agent modules of the cloud delivery nodes, the user's access request according to the mapping relationship comprises: determining an access source IP segment to which a source IP in the user's access request belongs, querying for IP of a preferred node corresponding to the access source IP segment according to the mapping relationship, judging whether the current cloud delivery node is the preferred node, returning an access response if the current cloud delivery node is the preferred node, and returning the IP of the preferred node to indicate a redirection operation if the current cloud delivery node is not the preferred node.

Wherein, the method further comprises: detecting cloud delivery nodes in real time, modifying the mapping relationship when it is detected that a cloud delivery node is faulty, deleting the faulty cloud delivery node from the mapping relationship when the mapping relationship comprises multiple preferred nodes and comprises the faulty cloud delivery node, and issuing the modified mapping relationship to the scheduling agent modules of the cloud delivery nodes in the network.

According to another aspect of the present application, an apparatus for scheduling an access request is provided, comprising:

a first determination module, configured to determine a city and a city operator corresponding to each access source IP segment;

a first selection module, configured to select at least one preferred node of the access source IP segment from cloud delivery nodes of the city operator;

a second determination module, configured to determine a mapping relationship between the access source IP segment and an IP of the preferred node; and a transmission module, configured to issue the mapping relationship to scheduling agent modules of the cloud delivery nodes in a network.

Wherein, the first selection module comprises a first obtaining module and a second selection module;

the first obtaining module is configured to obtain historical network transmission state parameters of the cloud delivery nodes of the city operator in processing data of the access source IP segment; and the second selection module is configured to select a preferred node according to the historical network transmission state parameters.

Wherein, the first selection module further comprises a second obtaining module;

the second obtaining module is configured to obtain real-time loads of the cloud delivery nodes of the city operator; and the second selection module is further configured to select a preferred node according to the historical network transmission state parameters and the real-time loads.

Wherein, the apparatus further comprises a receiving module and a scheduling agent module located in the cloud delivery node;

the receiving module is configured to receive a user's access request; and the scheduling agent module is configured to schedule the user's access request according to the mapping relationship.

Wherein, the scheduling agent module comprises:

a third determination module, configured to determine an access source IP segment to which a source IP in the user's access request belongs;

a query module, configured to query for IP of a preferred node corresponding to the access source IP segment according to the mapping relationship;

a judgment module, configured to judge whether a current cloud delivery node is the preferred node;

a feedback module, configured to return an access response if the current cloud delivery node is the preferred node, and return the IP of the preferred node to indicate a redirection operation if the current cloud delivery node is not the preferred node.

Wherein, the apparatus further comprises:

a detection module, configured to detect cloud delivery nodes in real time;

a modification module, configured to modify the mapping relationship when the detection module detects that a cloud delivery node is faulty, and delete the faulty cloud delivery node from the mapping relationship when the mapping relationship comprises multiple preferred nodes and comprises the faulty cloud delivery node; and a transmission module, configured to issue the modified mapping relationship to the scheduling agent modules of the cloud delivery nodes in the network.

According to still another aspect of the present application, there is provided a computer-readable storage medium having a computer program stored thereon, and the computer program, when executed, implements steps of the method.

According to yet another aspect of the present application, a computer device is provided, comprising a processor, a memory, and a computer program stored on the memory, and the computer program, when executed by the processor, implements steps of the method.

In the present application, by setting user IP segments based on city granularity, users in a same province can use the same or different LDNSs to achieve city granularity scheduling control, so as to schedule by the city level and access to a serving node in the optimal city level. This saves the scheduling paths, improves the scheduling efficiency, and avoids the waste of scheduling resources.

It should be understood that, the aforementioned general description and detailed description hereinafter are merely exemplary and explanatory, and the present application is not limited thereto.

BRIEF DESCRIPTION OF THE DRAWINGS

The accompanying drawings illustrated herein, which constitute part of the present application, are used to provide further understanding of the present application, and exemplary embodiments of the present application and the description thereof are used to explain the present application and not intended to inappropriately limit the present application. In the drawings.

DETAILED DESCRIPTION

The technical solutions in the embodiments of the present application will be described clearly and completely with reference to the accompanying drawings in the embodiments of the present application. Apparently, the embodiments to be described are some embodiments of the present application, rather than all embodiments of the present application. Based on the embodiments of the present application, all other embodiments obtained by a person of ordinary skill in the art without paying any creative effort are included in the protection scope of the present application. It is to be noted that the embodiments of the present application and features in the embodiments may be combined if not conflict.

Figure 1:
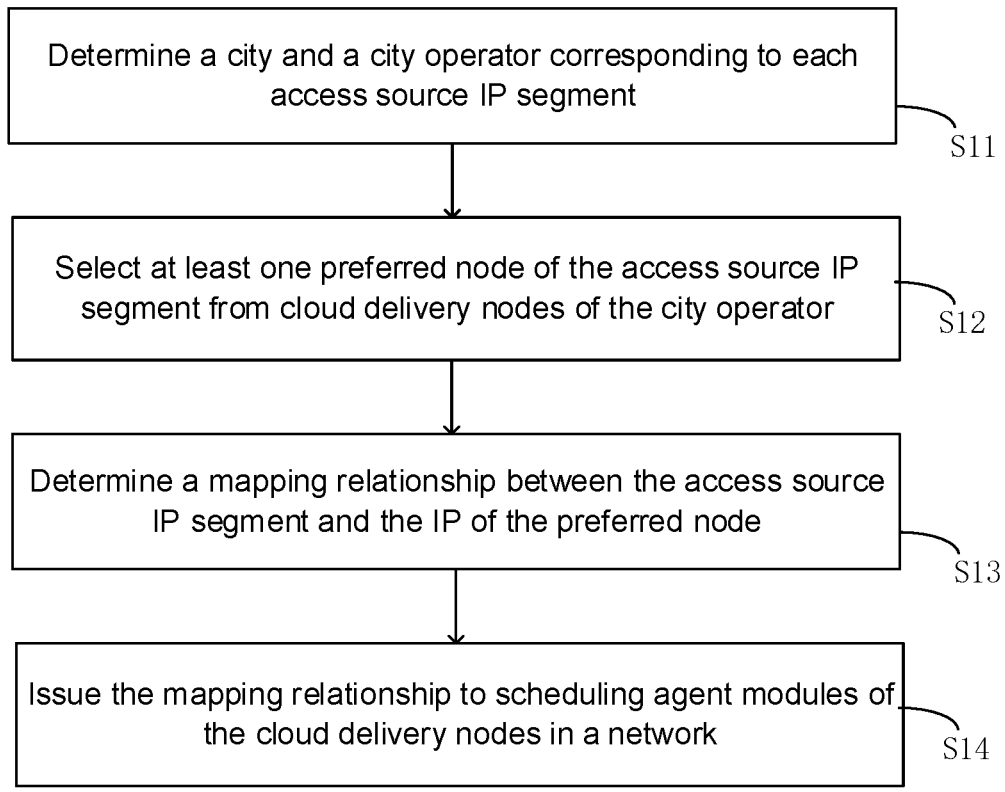
FIG. 1 is a flowchart of a method for scheduling an access request according to an exemplary embodiment.

FIG. 1 is a flowchart of a method for scheduling an access request according to an exemplary embodiment. The method comprises:

S11: determining a city and a city operator corresponding to each access source IP segment;

S12: selecting at least one preferred node of the access source IP segment from cloud delivery nodes of the city operator;

S13: determining a mapping relationship between the access source IP segment and the IP of the preferred node; and S14: issuing the mapping relationship to scheduling agent modules of the cloud delivery nodes in a network.

In this method, by setting user IP segments based on city granularity, users in a same province can use the same or different LDNSs to achieve city granularity scheduling control, so as to schedule by the city level and access to a serving node in the optimal city level. This saves the scheduling paths, improves the scheduling efficiency, and avoids the waste of scheduling resources.

In an embodiment, the cloud delivery node is a CDN node.

In an embodiment, in S11, log information is collected from the CDN log library to obtain and determine a city and a city operator corresponding to each access source IP segment.

In an embodiment, the step S12 of selecting at least one preferred node of the access source IP segment from cloud delivery nodes of the city operator comprises: by scheduling an IPING interface, obtaining historical network transmission state parameters of the cloud delivery nodes of the city operator in processing data of the access source IP segment, and selecting a preferred node according to the historical network transmission state parameters. The network transmission state parameters refer to data representing the state of network data transmission, for example delay time, packet loss rate, routing hops, etc.

In an embodiment, the step S12 of selecting at least one preferred node of the access source IP segment from cloud delivery nodes of the city operator further comprises: obtaining real-time loads of the cloud delivery nodes of the city operator. The real-time loads comprise at least one of bandwidth load, CPU load, disk load, and network card load. Wherein, selecting a preferred node according to the historical network transmission state parameters comprises: selecting a preferred node according to the historical network transmission state parameters and the real-time loads.

In an embodiment, in the mapping relationship, a same user source IP segment corresponds to one preferred node, or a same user source IP segment corresponds to multiple preferred nodes. All preferred nodes are sorted in order of priority from high to low. The mapping relationship is stored in the database.

In an embodiment, the method further comprises: detecting cloud delivery nodes in real time, modifying the mapping relationship when it is detected that a cloud delivery node is faulty, deleting the faulty cloud delivery node from the mapping relationship when the mapping relationship comprises multiple preferred nodes and comprises the faulty cloud delivery node, and issuing the modified mapping relationship to the scheduling agent modules of the cloud delivery nodes in the network. This scheduling agent module is specifically a 302 scheduling agent module. The scheduling performed by the 302 scheduling agent module is effective in real time. Compared with the scheduling method in the prior art in which it is necessary to wait for a DNS TTL effective time to take effect. The scheduling by the 302 scheduling agent module can take effect immediately, thereby effectively avoiding the network scheduling error caused by the delay in the effective time. The immediacy and effectiveness of the network are greatly improved.

In an embodiment, the method further comprises S15: after the cloud delivery nodes receive a user's access request, scheduling, by the scheduling agent modules of the cloud delivery nodes, the user's access request according to the mapping relationship. Specifically, this step comprises: determining an access source IP segment to which a source IP in the user's access request belongs, querying for IP of a preferred node corresponding to the access source IP segment according to the mapping relationship, judging whether the current cloud delivery node is the preferred node, returning an access response if the current cloud delivery node is the preferred node, and returning the IP of the preferred node to indicate a redirection operation if the current cloud delivery node is not the preferred node.

Figure 2:
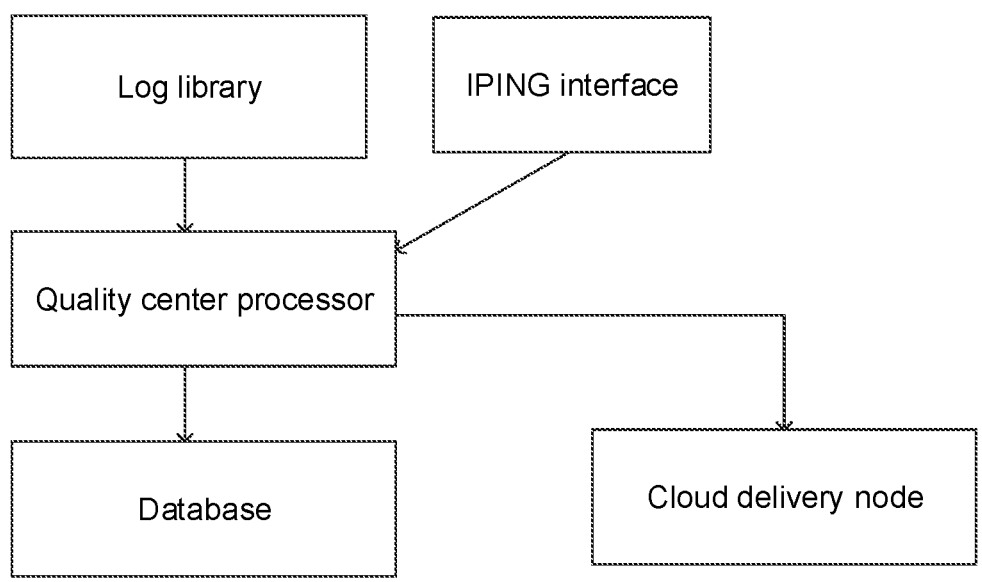
FIG. 2 is a block diagram of a system for scheduling an access request according to an exemplary embodiment.

As shown in FIG. 2, the system for scheduling an access request comprises a quality center processor, a log library, a database, and cloud delivery nodes.

A detailed description will be given below by a specific embodiment.

The source IP segment 192.168.1.0~24 is determined as belonging to city A-1 in province A and belongs to the first operator in city A-1 in province A.

The corresponding preferred node is a cloud delivery node of the first operator in city A-1 in province A, and the IP of this node is 3.3.3.3.

The mapping relationship 192.168.1.0~24→3.3.3.3 is formed and sent to the cloud delivery nodes in the entire network.

After a cloud delivery node with an IP of 3.3.3.3 receives a user's access request, it determines that the source IP of the user's access request is 192.168.1.1, that the user source IP segment to which this IP belongs is 192.168.1.0~24, and that the preferred node corresponding to this IP segment is a cloud delivery node with an IP of 3.3.3.3. It is determined that the current cloud delivery node is the preferred node, and an access response is returned.

A cloud delivery node with an IP of 2.2.2.2 is a cloud delivery node of the first operator in city A-1 in province A. After receiving a user's access request, it is determined that the source IP of the user's access request is 192.168.1.1, that the user source IP segment to which the IP belongs is 192.168.1.0~24, and that the preferred node of this IP segment is the cloud delivery node with an IP of 3.3.3.3. It is determined that the current cloud delivery node is not the preferred node, and the IP of the preferred node is returned to indicate a redirection operation so that the user re-initiates an access request to this preferred node.

Figure 3:
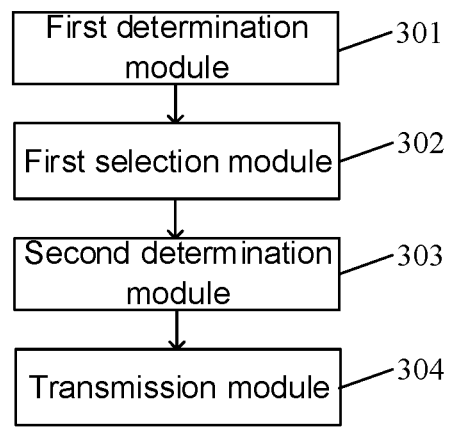
FIG. 3 is a block diagram of an apparatus for scheduling an access request according to an exemplary embodiment.

FIG. 3 is a block diagram of a device for scheduling an access request according to an exemplary embodiment. The device comprises:

a first determination module 301, configured to determine a city and a city operator corresponding to each access source IP segment;

a first selection module 302, configured to select at least one preferred node of the access source IP segment from cloud delivery nodes of the city operator;

a second determination module 303, configured to determine a mapping relationship between the access source IP segment and the IP of the preferred node; and a transmission module 304, configured to issue the mapping relationship to scheduling agent modules of the cloud delivery nodes in a network.

In an embodiment, the first selection module 302 comprises a first obtaining module and a second selection module;

the first obtaining module is configured to obtain historical network transmission state parameters of the cloud delivery nodes of the city operator in processing data of the access source IP segment; and the second selection module is configured to select a preferred node according to the historical network transmission state parameters.

In an embodiment, the first selection module 302 further comprises a second obtaining module;

the second obtaining module is configured to obtain real-time loads of the cloud delivery nodes of the city operator; and the second selection module is further configured to select a preferred node according to the historical network transmission state parameters and the real-time loads.

In an embodiment, the apparatus further comprises a receiving module and a scheduling agent module located in a cloud delivery node;

the receiving module is configured to receive a user's access request; and the scheduling agent module is configured to schedule the user's access request according to the mapping relationship.

In an embodiment, the scheduling agent module comprises:

a third determination module, configured to determine an access source IP segment to which a source IP in the user's access request belongs;

a query module, configured to query for IP of a preferred node corresponding to the access source IP segment according to the mapping relationship;

a judgment module, configured to judge whether the current cloud delivery node is the preferred node;

a feedback module, configured to return an access response if the current cloud delivery node is the preferred node, and return the IP of the preferred node to indicate a redirection operation if the current cloud delivery node is not the preferred node.

In an embodiment, the apparatus further comprises:

a detection module, configured to detect cloud delivery nodes in real time;

a modification module, configured to modify the mapping relationship when the detection module detects that a cloud delivery node is faulty, and delete the faulty cloud delivery node from the mapping relationship when the mapping relationship comprises multiple preferred nodes and comprises the faulty cloud delivery node; and a transmission module 104, configured to issue the modified mapping relationship to the scheduling agent modules of the cloud delivery nodes in the network.

Figure 4:
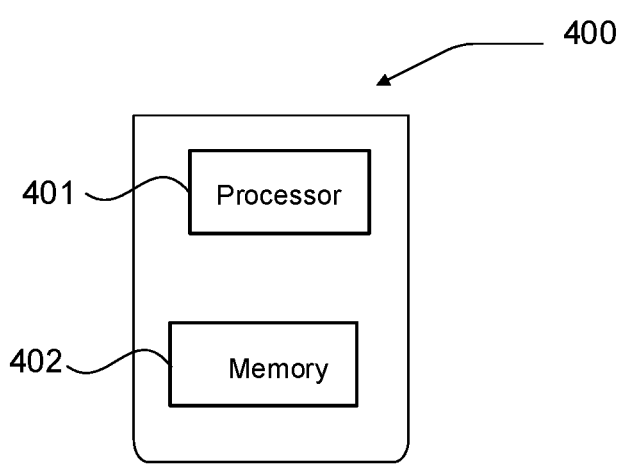
FIG. 4 is a block diagram of a computer device according to an exemplary embodiment.

FIG. 4 is a block diagram of a computer device 400 for scheduling an access request according to an exemplary embodiment. For example, the computer device 400 may be provided as a server. Referring to FIG. 4, the computer device 400 comprises a processor 401. One or more processors may be provided according to actual needs. The computer device 400 further comprises a memory 402 configured to store instructions executable by the processor 401, for example application programs. One or more memories may be provided according to actual needs. There may be one or more application programs stored in the memory. The processor 401 is configured to execute instructions to perform the method described above.

The present application further provides a computer-readable storage medium having a computer program stored thereon, and the computer program, when executed, implements steps of the method.

It may be understood by those skilled in the art that the embodiments of the present application may be provided as methods, apparatuses (devices), or computer program products. Therefore, the present application may be in the form of an only hardware embodiment, an only software embodiment, or an embodiment combining software and hardware. Moreover, the present application may be in the form of a computer program product implemented on one or more computer-usable storage media containing computer-usable program codes. The computer storage media comprise volatile and nonvolatile, removable and non-removable media implemented in any method or technology for storing information (for example computer-readable instructions, data structures, program modules, or other data), including but not limited to RAMs, ROMs, EEPROMs, flash memories or other memories, CD-ROMs, digital versatile disks (DVD) or other optical disk storages, magnetic cartridges, magnetic tapes, magnetic disk storages or other magnetic storage devices, or any other media that may be used to store desired information and may be accessed by a computer. In addition, as known to a person of ordinary skill in the art, the communication media usually contain computer-readable instructions, data structures, program modules, or other data in modulated data signals such as carriers or other transmission mechanisms, and may include any information delivery media.

The present application has been described with reference to flowcharts and/or block diagrams of the methods, apparatuses (devices) and computer program products according to embodiments of the present application. It should be understood that each flow and/or block in the flowchart and/or block diagram and the combination of flows and/or blocks in the flowchart and/or block diagram may be implemented by computer program instructions. These computer program instructions may be provided to the processors of general-purpose computers, special-purpose computers, embedded processors, or other programmable data processing devices to produce a machine, so that the instructions executed by the processors of the computers or other programmable data processing devices produce an apparatus that realizes the functions specified in one or more flows in the flowchart and/or one or more blocks in the block diagram.

These computer program instructions may be stored in computer-readable memories that can direct computers or other programmable data processing devices to work in a specific manner, so that the instructions stored in the computer-readable memories produce an article of manufacture including the instruction apparatus. The instruction apparatus implements the functions specified in one or more flows in the flowchart and/or one or more blocks in the block diagram.

These computer program instructions may be loaded on computers or other programmable data processing devices, so that a series of operating steps are executed on the computers or other programmable devices to produce computer-implemented processing. Thus, the instructions executed on the computers or other programmable devices provide steps for implementing the functions specified in one or more flows in the flowchart and/or one or more blocks in the block diagram.

Herein, terms "comprise," "include" and variants thereof are intended to cover non-exclusive inclusion, so that an article or a device including a series of elements not only includes these elements, but also includes other elements not explicitly listed, or further includes inherent elements of the article or the device. Without further limitation, an element as defined by a statement "including a . . . " is not exclusive of additional identical elements in the article or the device of the element.

Although the preferred embodiments of the present application have been described, those skilled in the art can make additional changes and modifications to these embodiments once they learn the basic creative concept. Therefore, the appended claims are intended to be interpreted as comprising the preferred embodiments and all changes and modifications falling into the scope of the present application.

Apparently, those skilled in the art can make various modifications and variations to the present application without departing from the spirit and scope of the present application. In this way, if these modifications and variations of the present application fall into the scope of the claims of the present application and their equivalents, the present application is intended to encompass these modifications and variations.

INDUSTRIAL APPLICABILITY

In the present application, by setting user IP segments based on city granularity, users in a same province can use the same or different LDNSs to achieve city granularity scheduling control, so as to schedule by the city level and access to a serving node in the optimal city level. This saves the scheduling paths, improves the scheduling efficiency, and avoids the waste of scheduling resources.

The invention claimed is:

1. An access request scheduling method, implemented by one or more processors, comprising:
   determining a city and a city operator corresponding to an access source IP segment;
   selecting, from cloud delivery nodes of the city operator, a preferred node of the access source IP segment;
   determining a mapping relationship between the access source IP segment and an IP of the preferred node;
   issuing the mapping relationship to scheduling agent modules of the cloud delivery nodes in a network; and
   after a current cloud delivery node of the cloud delivery nodes receives a user's access request, scheduling, by the scheduling agent module of the current cloud delivery node, the user's access request according to the mapping relationship, including:
      determining an access source IP segment to which a source IP in the user's access request belongs;

querying for the IP of the preferred node corresponding to the access source IP segment according to the mapping relationship;
judging whether the current cloud delivery node is the preferred node;
returning an access response in response to the current cloud delivery node being the preferred node; and
returning the IP of the preferred node to indicate a redirection operation in response to the current cloud delivery node being not the preferred node.

2. The method according to claim 1, wherein selecting the preferred node includes:
obtaining historical network transmission state parameters of the cloud delivery nodes of the city operator in processing data of the access source IP segment; and
selecting the preferred node according to the historical network transmission state parameters.

3. The method according to claim 2, wherein:
selecting the preferred node further includes obtaining real-time loads of the cloud delivery nodes of the city operator; and
selecting the preferred node according to the historical network transmission state parameters includes selecting the preferred node according to the historical network transmission state parameters and the real-time loads.

4. The method according to claim 1, further comprising:
detecting the cloud delivery nodes in real time; and
in response to detecting that the cloud delivery nodes include a faulty cloud delivery node and the faulty cloud delivery node is one of a plurality of preferred nodes in the mapping relationship:
deleting the faulty cloud delivery node from the mapping relationship to generate a modified mapping relationship; and
issuing the modified mapping relationship to the scheduling agent modules of the cloud delivery nodes in the network.

5. A non-transitory computer-readable storage medium storing a computer program that, when executed by a processor, causes the processor to perform the method according to claim 1.

6. A computer device comprising:
a processor; and
a memory storing a computer program that, when executed by the processor, causes the processor to:
determine a city and a city operator corresponding to an access source IP segment;
select, from cloud delivery nodes of the city operator, a preferred node of the access source IP segment;
determine a mapping relationship between the access source IP segment and an IP of the preferred node;
issue the mapping relationship to scheduling agent modules of the cloud delivery nodes in a network; and
after a current cloud delivery node of the cloud delivery nodes receives a user's access request, scheduling, by the scheduling agent module of the current cloud delivery node, the access request according to the mapping relationship, including:
determining an access source IP segment to which a source IP in the user's access request belongs;
querying for the IP of the preferred node corresponding to the access source IP segment according to the mapping relationship;
judging whether the current cloud delivery node is the preferred node;
returning an access response in response to the current cloud delivery node being the preferred node; and
returning the IP of the preferred node to indicate a redirection operation in response to the current cloud delivery node being not the preferred node.

7. The computer device according to claim 6, wherein the computer program further causes the processor to:
obtain historical network transmission state parameters of the cloud delivery nodes of the city operator in processing data of the access source IP segment; and
select the preferred node according to the historical network transmission state parameters.

8. The computer device according to claim 7, wherein the computer program further causes the processor to:
obtain real-time loads of the cloud delivery nodes of the city operator; and
select the preferred node according to the historical network transmission state parameters and the real-time loads.

9. The computer device according to claim 6, wherein the computer program further causes the processor to:
detect the cloud delivery nodes in real time; and
in response to detecting that the cloud delivery nodes include a faulty cloud delivery node and the faulty cloud delivery node is one of a plurality of preferred nodes in the mapping relationship:
delete the faulty cloud delivery node from the mapping relationship to generate a modified mapping relationship; and
issue the modified mapping relationship to the scheduling agent modules of the cloud delivery nodes in the network.

10. A computer device implemented in a cloud delivery node comprising:
a processor; and
a memory storing a computer program that, when executed by the processor, causes the processor to:
receive an access request; and
schedule the access request according to a mapping relationship between an access source IP segment and an IP of a preferred node, the preferred node being determined by:
determining a city and a city operator corresponding to the access source IP segment; and
selecting, from cloud delivery nodes of the city operator, the preferred node of the access source IP segment;
wherein the computer program further causes the processor to:
determine an access source IP segment to which a source IP in the access request belongs;
query for the IP of the preferred node corresponding to the access source IP segment according to the mapping relationship;
judge whether the cloud delivery node is the preferred node;
return an access response in response to the cloud delivery node being the preferred node; and
return the IP of the preferred node to indicate a redirection operation in response to the cloud delivery node being not the preferred node.

* * * * *